United States Patent
Watanabe et al.

(10) Patent No.: US 11,244,488 B2
(45) Date of Patent: Feb. 8, 2022

(54) VIDEO PROCESSING DEVICE, VIDEO PROCESSING SYSTEM, AND VIDEO PROCESSING METHOD

(71) Applicant: PANASONIC INTELLECTUAL PROPERTY MANAGEMENT CO., LTD., Osaka (JP)

(72) Inventors: Takeshi Watanabe, Kanagawa (JP); Takeshi Fujimatsu, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/042,105

(22) PCT Filed: Mar. 20, 2019

(86) PCT No.: PCT/JP2019/011838
§ 371 (c)(1),
(2) Date: Sep. 26, 2020

(87) PCT Pub. No.: WO2019/198452
PCT Pub. Date: Oct. 17, 2019

(65) Prior Publication Data
US 2021/0192816 A1 Jun. 24, 2021

(30) Foreign Application Priority Data
Apr. 12, 2018 (JP) .............................. JP2018-076626

(51) Int. Cl.
*G06T 11/60* (2006.01)
*H04N 7/18* (2006.01)
(Continued)

(52) U.S. Cl.
CPC .......... *G06T 11/60* (2013.01); *G06K 9/00711* (2013.01); *G06K 9/00771* (2013.01); *H04N 7/18* (2013.01); *G06K 2009/00738* (2013.01)

(58) Field of Classification Search
USPC ...................... 348/169, 208.14, 661, 61, 157
See application file for complete search history.

(56) References Cited

U.S. PATENT DOCUMENTS

| 10,008,240 B2* | 6/2018 | Koide ..................... G11B 27/34 |
| 2009/0060271 A1* | 3/2009 | Kim ....................... H04N 7/181 382/103 |

(Continued)

FOREIGN PATENT DOCUMENTS

| JP | 2005-286468 | 10/2005 |
| JP | 2009-194687 | 8/2009 |

(Continued)

OTHER PUBLICATIONS

International Search Report (ISR) from International Searching Authority (Japan Patent Office) in International Pat. Appl. No. PCT/JP2019/011838, dated Jun. 18, 2019, together with an English language translation thereof.

*Primary Examiner* — Daquan Zhao
(74) *Attorney, Agent, or Firm* — Greenblum & Bernstein, P.L.C.

(57) ABSTRACT

A video processing device includes: an object detector configured to detect an object included in a video so that a type of the object can be identified; an event detector configured to detect a focusing event which occurs to the detected object; a masking target setter configured to simultaneously set all objects of a selected type as masking targets, and to exclude from the masking targets, one or more objects to which occurrence of the selected focusing event has been detected by the event detector; and a masking process controller configured to generate a masking-pro- (Continued)

cessed video in which each video area which corresponds to the object set as the masking target by the masking target setter, has been changed to a masking image.

10 Claims, 10 Drawing Sheets

(51) Int. Cl.
*G06K 9/00* (2006.01)
*H04N 5/225* (2006.01)
*H04N 5/228* (2006.01)

(56) References Cited

U.S. PATENT DOCUMENTS

| | | | |
|---|---|---|---|
| 2009/0207269 A1 | 8/2009 | Yoda | |
| 2010/0328460 A1* | 12/2010 | Merkel | G08B 13/19686 348/143 |
| 2011/0096922 A1 | 4/2011 | Oya | |
| 2015/0161467 A1 | 6/2015 | Honda | |
| 2016/0132731 A1* | 5/2016 | Hisada | G06K 9/6253 382/103 |
| 2016/0307597 A1 | 10/2016 | Koide et al. | |
| 2017/0113142 A1 | 4/2017 | Miyamae et al. | |

FOREIGN PATENT DOCUMENTS

| | | |
|---|---|---|
| JP | 2011-091705 | 5/2011 |
| JP | 2015-114828 | 6/2015 |
| JP | 2015-230683 | 12/2015 |
| JP | 2016-208128 | 12/2016 |

* cited by examiner

VIDEO PROCESSING DEVICE, VIDEO PROCESSING SYSTEM, AND VIDEO PROCESSING METHOD

TECHNICAL FIELD

The present invention relates to a video processing device, a video processing system, and a video processing method for identifying an object from a video of a surveillance target area and performing masking operations based on inputs provided by a user.

BACKGROUND ART

Surveillance systems are widely used, in which cameras are utilized to shoot videos of a surveillance target area and various surveillance operations are performed based on the videos provided from the cameras. Videos collected by such surveillance systems can be used as evidence in court and/or news footages. In this case, privacy protection in videos is required. Thus, when a video shows a person who needs for privacy protection, masking operations are desirably performed on the video so that a video area corresponding to the person is masked.

Known technologies related to such masking operations include a configuration in which masking operations are performed on a video so as to mask persons shown therein, and when occurrence of a specific event to a person in the video is detected, the person in the video is unmasked (see Patent Document 1). In another configuration, permissions to browse original video images of certain types of objects (such as person, vehicle) are set for each surveillance guard, so that specific types of objects which a surveillance guard has permissions to browse, are unmasked (see Patent Document 2).

PRIOR ART DOCUMENT (S)

Patent Document(s)

Patent Document 1: JP2011-091705A
Patent Document 1: JP2005-286468A

SUMMARY OF THE INVENTION

Examples of types of objects which can appear in a video and which require privacy protection include persons, vehicles, animals, and signboards. In addition, objects requiring privacy protection can also appear even in a background area where no specific types of objects are detected. Thus, preferably, masking conditions used for designating objects as masking targets can be properly set according to the situation shown in a video in which various objects requiring privacy protection show up.

Even in cases where masking operations are performed uniformly on a video based on certain masking conditions as disclosed in Patent Documents 1 and 2, using partial unmasking operations (partially removing masks) is beneficial when a user focuses on a specific object and wishes to observe a detailed status of the object. Moreover, objects to be chosen as unmasking targets vary depending on videos. Thus, preferably, unmasking conditions used for excluding objects from the masking targets are enabled to be properly set according to the situation shown in a video.

However, the problem is that the above-described prior arts do not take into account the need to properly set masking and unmasking conditions according to the situation shown in a video, and thus do not enable efficient generation of a masking-processed video on which masking operations have been properly performed according to the situation shown in a video.

The present invention has been made in view of such problems of the prior art, and a primary object of the present invention is to provide a video processing device, a masking-processed video processing system, and a video processing method which enable efficient generation of a masking-processed video on which masking operations have been properly performed according to the situation shown in a video in which various objects requiring privacy protection show up.

An aspect of the present invention provides a video processing device for identifying an object from a video of a surveillance target area and performing masking operations based on inputs provided by a user, the device comprising: an object detector configured to detect an object included in the video in such a manner that a type of the object can be identified; an event detector configured to detect a focusing event which occurs to the object detected by the object detector; a masking target setter configured such that, in response to the user's input operation for selecting the type of objects as a masking condition, the masking target setter simultaneously sets all objects of the selected type as masking targets, and that, in response to the user's input operation for selecting the focusing event as an unmasking condition, the masking target setter excludes, from the masking targets, one or more objects to which occurrence of the selected focusing event has been detected by the event detector; and a masking process controller configured to generate a masking-processed video in which each video area which corresponds to the object set as the masking target by the masking target setter, has been changed to a masking image.

Another aspect of the present invention provides a video processing system for identifying an object from a video of a surveillance target area and performing masking operations based on inputs provided by a user, the device comprising: a camera configured to shoot a video for the surveillance target area; a recorder configured to record the video shot by the camera; a video processing device configured to acquire the video from at least one of the camera and the recorder and performs masking operations; and a video browsing device configured to display a masking-processed video generated by the video processing device, wherein the video processing device comprises: an object detector configured to detect an object included in the video in such a manner that a type of the object can be identified; an event detector configured to detect a focusing event which occurs to the object detected by the object detector; a masking target setter configured such that, in response to the user's input operation for selecting the type of objects as a masking condition, the masking target setter simultaneously sets all objects of the selected type as masking targets, and that, in response to the user's input operation for selecting the focusing event as an unmasking condition, the masking target setter excludes, from the masking targets, one or more objects to which occurrence of the selected focusing event has been detected by the event detector; and a masking process controller configured to generate a masking-processed video in which each video area which corresponds to the object set as the masking target by the masking target setter, has been changed to a masking image.

Yet another aspect of the present invention provides a video processing method for identifying an object from a video of a surveillance target area and performing masking operations based on inputs provided by a user, the method being performed by a processor in a video processing device, the method comprising: detecting an object included in the video in such a manner that a type of the object can be identified; detecting a focusing event which occurs to the object detected by the object detector; in response to the user's input operation for selecting the type of objects as a masking condition, simultaneously setting all objects of the selected type as masking targets, while, in response to the user's input operation for selecting the focusing event as an unmasking condition, excluding, from the masking targets, one or more objects to which occurrence of the selected focusing event has been detected by the event detector; and generating a masking-processed video in which each video area which corresponds to the object set as the masking target, has been changed to a masking image.

According to the present disclosure, masking conditions used for designating objects as masking targets and unmasking conditions used for excluding objects from the masking targets are set in response to user's input operation. As a result, it becomes possible to properly set the masking conditions and the unmasking conditions according to the situation shown in a video in which various objects requiring privacy protection show up, thereby enabling efficient generation of a masking-processed video on which masking operations have been properly performed.

DESCRIPTION OF THE PREFERRED EMBODIMENT(S)

Figure 1:
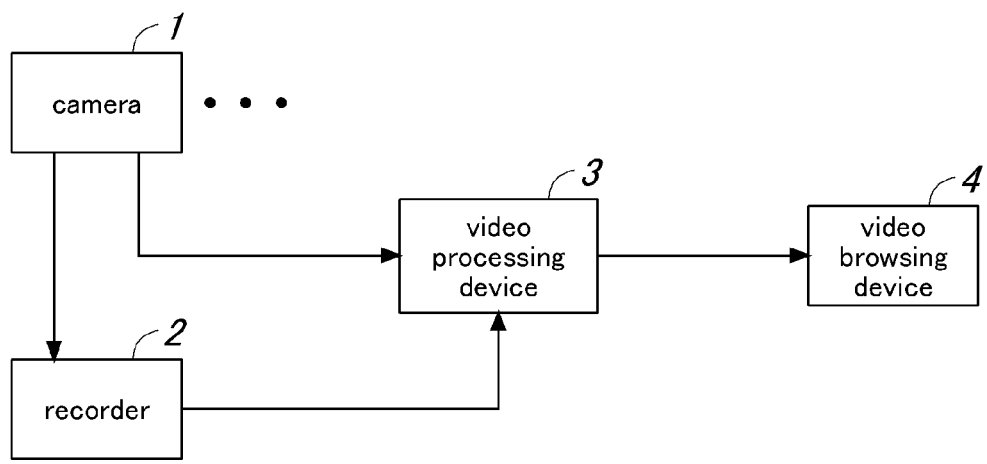
FIG. 1 is a diagram showing a general configuration of a video processing system (monitoring system) according to a first embodiment of the present invention.

A first aspect of the present invention made to achieve the above-described object is a video processing device for identifying an object from a video of a surveillance target area and performing masking operations based on inputs provided by a user, the device comprising: an object detector configured to detect an object included in the video in such a manner that a type of the object can be identified; an event detector configured to detect a focusing event which occurs to the object detected by the object detector; a masking target setter configured such that, in response to the user's input operation for selecting the type of objects as a masking condition, the masking target setter simultaneously sets all objects of the selected type as masking targets, and that, in response to the user's input operation for selecting the focusing event as an unmasking condition, the masking target setter excludes, from the masking targets, one or more objects to which occurrence of the selected focusing event has been detected by the event detector; and a masking process controller configured to generate a masking-processed video in which each video area which corresponds to the object set as the masking target by the masking target setter, has been changed to a masking image.

In this configuration, masking conditions used for designating objects as masking targets and unmasking conditions used for excluding objects from the masking targets are set in response to user's input operation. As a result, it becomes possible to properly set the masking conditions and the unmasking conditions according to the situation shown in a video in which various objects requiring privacy protection show up, thereby enabling efficient generation of a masking-processed video on which masking operations have been properly performed.

A second aspect of the present invention is the video processing device of the first aspect, wherein the masking target setter is configured such that, in response to the user's input operation for selecting a background as a masking condition, the masking target setter sets a background area where no object is detected by the object detector as a masking target.

This configuration enables the background area to be subject to the masking operations. As a result, even when things requiring privacy protection are located in a video area where no object is detected, their privacy protection can be achieved.

A third aspect of the present invention is the video processing device of the first or second aspect, wherein the masking process controller is configured such that, when the masking target setter sets all types of the objects and the background as the masking targets in response to the user's input operation for selecting all the types of the objects and the background, the masking process controller performs an operation for reducing object-identifiability on all video areas other than the objects to which occurrence of the selected focusing event has been detected.

In this configuration, only objects that meet the unmasking conditions are enabled to be identifiable.

A fourth aspect of the present invention is the video processing device of any of the first to third aspects, wherein the masking target setter is configured such that, when persons or vehicles are selected as types of objects to be set as the masking condition, the masking target setter enables the user to select a focusing event to be set as the unmasking condition.

This configuration enables a user to designate the unmasking conditions with regard to persons or vehicles. As a result, it becomes possible to exclude, from the masking targets, a person or a vehicle to which occurrence of a focusing event (i.e. event of interest) such as an abnormal status has been detected, thereby enabling the user to make a detailed observation of the excluded object(s).

A fifth aspect of the present invention is the video processing device of any of the first to fourth aspects, wherein the masking image is a label image with characters representing a generic name of the object This configuration enables a viewer to easily identify each object subject to masking operations by displaying a generic name, which indicates a type or attribute of the object.

A sixth aspect of the present invention is t the video processing device of any of the first to fourth aspects, wherein the masking image is an avatar image which imitates a person.

This configuration enables a viewer to easily recognize from the presence of an avatar image that a person is present in the video.

A seventh aspect of the present invention is the video processing device of any of the first to sixth aspects, wherein the masking target setter is configured such that, in response to the user's input operation for individually designating each object to be a masking target, the masking target setter sets the designated object as the masking target, and that, in response to the user's input operation for individually designating each object to be excluded from the masking targets, the masking target setter excludes the designated object from the masking targets.

This configuration enables each object to be set as a masking target or excluded from the masking targets on an individual basis.

An eighth aspect of the present invention is t the video processing device of the seventh aspect, further comprising: a thumbnail generator configured to generate a thumbnail image for each object; and a screen controller configured to display an edit screen on a display, wherein the screen controller displays a list of selection controls in which, for each object, a selection control is arranged side by side with a corresponding thumbnails image, wherein each selection control is used to select whether a corresponding object is designated to be a masking target or designated to be excluded from the masking targets.

This configuration enables a viewer to confirm the presence of an object through a thumbnail image before selecting whether to set the object as a masking target or exclude the object from the masking targets.

A ninth aspect of the present invention is a video processing system for identifying an object from a video of a surveillance target area and performing masking operations based on inputs provided by a user, the device comprising: a camera configured to shoot a video for the surveillance target area; a recorder configured to record the video shot by the camera; a video processing device configured to acquire the video from at least one of the camera and the recorder and performs masking operations; and a video browsing device configured to display a masking-processed video generated by the video processing device, wherein the video processing device comprises: an object detector configured to detect an object included in the video in such a manner that a type of the object can be identified; an event detector configured to detect a focusing event which occurs to the object detected by the object detector; a masking target setter configured such that, in response to the user's input operation for selecting the type of objects as a masking condition, the masking target setter simultaneously sets all objects of the selected type as masking targets, and that, in response to the user's input operation for selecting the focusing event as an unmasking condition, the masking target setter excludes, from the masking targets, one or more objects to which occurrence of the selected focusing event has been detected by the event detector; and a masking process controller configured to generate a masking-processed video in which each video area which corresponds to the object set as the masking target by the masking target setter, has been changed to a masking image.

This configuration enables efficient generation of a masking-processed video on which masking operations have been properly performed according to the situation shown in a video in which various objects requiring privacy protection show up, in the same manner as the first aspect.

A tenth aspect of the present invention is a video processing method for identifying an object from a video of a surveillance target area and performing masking operations based on inputs provided by a user, the method being performed by a processor in a video processing device, the method comprising: detecting an object included in the video in such a manner that a type of the object can be identified; detecting a focusing event which occurs to the object detected by the object detector; in response to the user's input operation for selecting the type of objects as a masking condition, simultaneously setting all objects of the selected type as masking targets, while, in response to the user's input operation for selecting the focusing event as an unmasking condition, excluding, from the masking targets, one or more objects to which occurrence of the selected focusing event has been detected by the event detector; and generating a masking-processed video in which each video area which corresponds to the object set as the masking target, has been changed to a masking image.

This configuration enables efficient generation of a masking-processed video on which masking operations have been properly performed according to the situation shown in a video in which various objects requiring privacy protection show up, in the same manner as the first aspect.

Embodiments of the present invention will be described below with reference to the drawings.

First Embodiment

FIG. 1 is a diagram showing a general configuration of a video processing system according to a first embodiment of the present invention.

The video processing system is configured such that, when a video of a surveillance target area shows an object(s) requiring privacy protection, the system performs masking operations on the video and provides a masking-processed video to a viewer. The video processing system includes a camera 1, a recorder 2, a video processing device 3, and a video browsing device 4.

The camera 1 is configured to shoot a video(s) of the surveillance target area(s). The surveillance target areas may be various areas, including those in facilities such as stores and hospitals, and outdoor roads. The camera may be a fixed camera or a wearable camera worn by a person such as a police officer or a security guard.

The recorder 2 is configured to record videos provided from the camera 1.

The video processing device 3 is configured to acquire a video provided from the camera 1 or the recorder 2 and performs masking operations on the video for privacy protection.

The video browsing device 4 is configured to acquire a masking-processed video (moving picture) generated by the video processing device 3, and display the masking-processed video on a screen.

Such a masking-processed video generated by the video processing device 3 can be used as evidence in court. In this case, a video browsing device 4 disposed in a courthouse is used by people who are involved in a trial to browse the masking-processed video. Such a masking-processed video can also be used as a news footage. In this case, a broadcaster such as a TV station broadcasts the masking-processed video and viewers receive and browse the masking-processed video at their respective video browsing devices 4.

Processing operations performed by the video processing device 3 may be post-shot processing operations (those performed after video shooting) or real-time processing operations performed simultaneously with video-shooting. Moreover, when the device performs real-time processing operations, the camera 1 and the video processing device 3 may be connected to the network. Furthermore, when the device performs only post-shot processing operations, videos stored in the recorder 2 may be transferred to the video processing device 3 via an appropriate storage medium.

Figure 2:
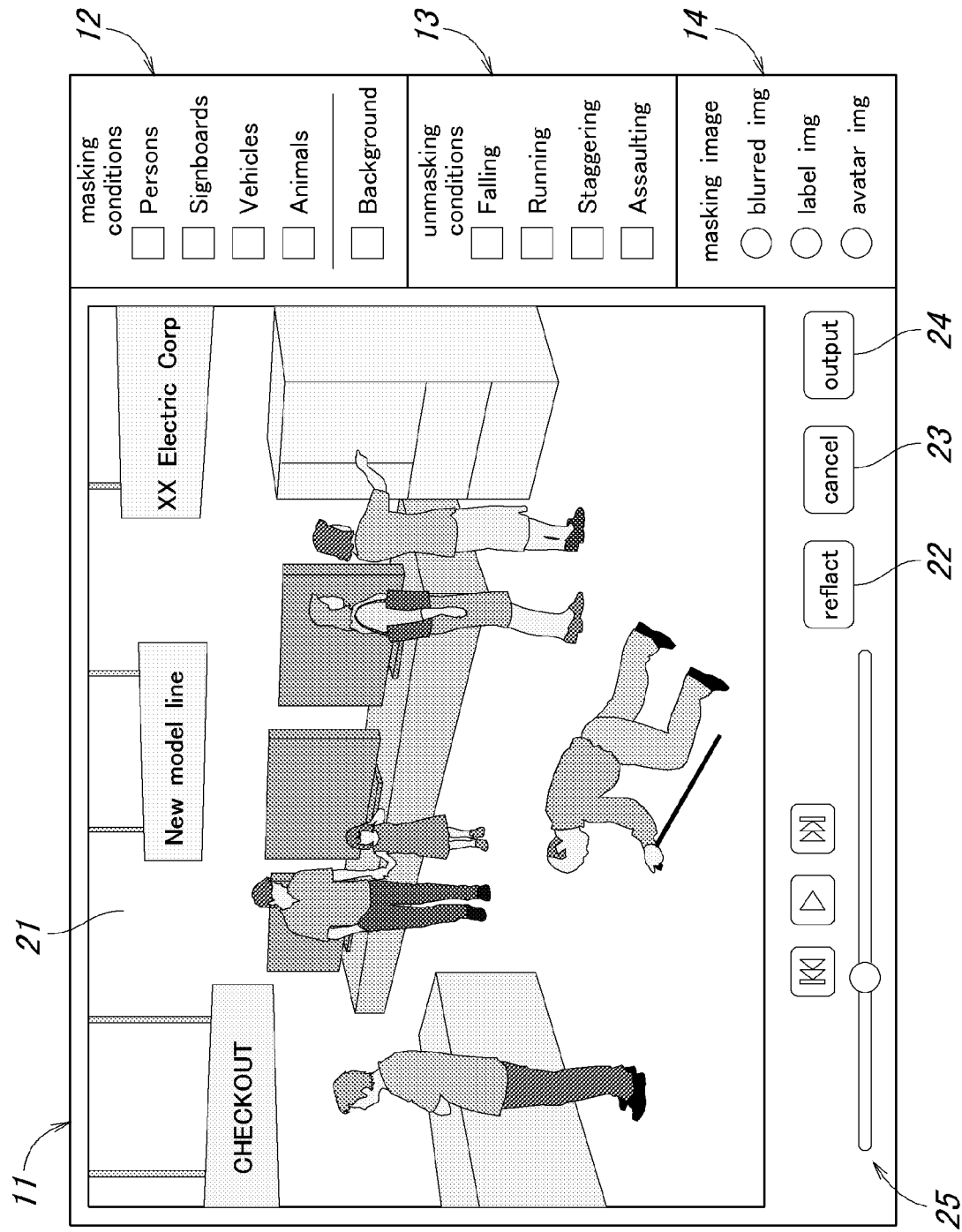
FIG. 2 is an explanatory diagram showing an edit screen displayed on a video processing device 3.
Figure 3:
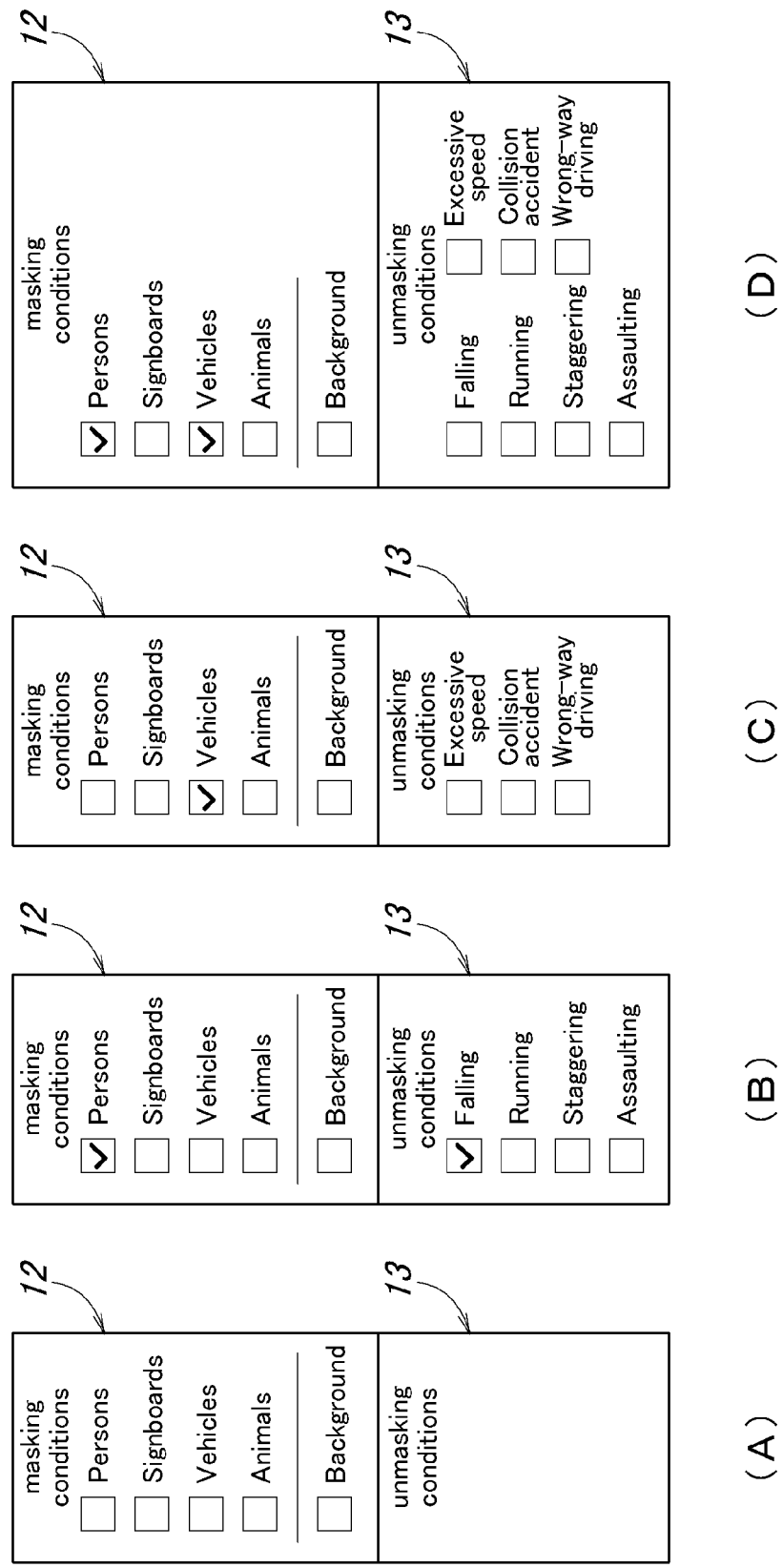
FIG. 3 is an explanatory diagram showing transitions of a critical part of the edit screen.

Next, an edit screen displayed on the video processing device 3 will be described. FIG. 2 is an explanatory diagram showing an edit screen displayed on the video processing device 3. FIG. 3 is an explanatory diagram showing transitions of a critical part of the edit screen.

Displayed on the video processing device 3 is an edit screen for editing videos acquired from the camera 1 or the recorder 2. As shown in FIG. 2, the edit screen includes a video display 11, a masking condition designator 12, an unmasking condition designator 13, and a mask type designator 14.

The video display 11 displays a video 21 to be edited.

The video display 11 includes a "reflect" button 22, a "cancel" button 23, and an "output" button 24. When a user operates the "reflect" button 22, the video display 11 displays a masking-processed video 21 on which the masking operations have been performed such that the video 21 reflects the conditions designated by the masking condition designator 12, the unmasking condition designator 13, and the mask type designator 14. When a user operates the "cancel" button 23, the video display 11 displays an original video with the cancelations of all masking operations performed thereon. When a user operates the "output" button 24, the video processing device 3 generates a video file containing a masking-processed video so that the video file can be delivered to where the masking-processed video is used.

The video display 11 includes a reproduction controller 25. The reproduction controller 25 includes play, pause, rewind, and fast-forward buttons which allow a user to play, pause, rewind, and fast-forward the video, and a slider bar which allows a user to move a location where the user wishes to start playing the video.

The masking condition designator 12 allows a user to designate masking conditions; that is, to designate one or more objects to be masking targets. In the present embodiment, a user can select one or more of different types of objects (Persons, Signboards, Vehicles, Animals) and/or a background, thereby designating masking conditions. The masking condition designator 12 includes check boxes for respective types of objects and a check box for a background.

When a user selects Persons, persons in the video are set as masking targets, and a video area corresponding to each person is changed to a masking image. When a user selects Signboards, signboards in the video are set as masking targets, and a video area corresponding to each signboard is changed to a masking image. When a user selects Vehicles, vehicles in the video are set as masking targets, and a video area corresponding to each vehicle is changed to a masking image. When a user selects Animals, animals in the video are set as masking targets, and a video area corresponding to each animal is changed to a masking image. When a user selects Background, background areas in the video are set as masking targets, and a video area corresponding to each background area is changed to a masking image.

When one or more of persons, signboards, vehicles and animals require privacy protection, a user may select the types of objects requiring privacy protection. When anything other than persons, signboards, vehicles and animals requires privacy protection, a user may select Background. Examples of the signboards include a nameplate, a bulletin board, and a guide board.

The unmasking condition designator 13 allows a user to designate unmasking conditions; that is, to exclude one or more objects from the masking targets. In the present embodiment, a user can select one or more of focusing events, thereby designating unmasking conditions. The unmasking condition designator 13 includes check boxes for respective focusing events. Selectable focusing events at the unmasking condition designator 13 vary depending on the types of objects selected at the masking condition designator 12.

In the present embodiment, a user can designate unmasking conditions only when the user selects persons or vehicles as the masking condition. When a user selects Persons as a masking condition, an abnormal status of a person (such as Falling, Running, Staggering, and Assaulting) can be designated as a focusing event, which is to be an unmasking condition. Thus, a person to whom occurrence of an abnormal status is detected is excluded from the masking targets. When a user selects Vehicle as a masking condition, an abnormal status of a vehicle (such as Excessive speed, Collision accident, and Wrong-way driving) can be designated as a focusing event, which is to be an unmasking condition. Thus, a vehicle to which occurrence of an abnormal status is detected is excluded from the masking targets.

More specifically, as shown in FIG. 3A, when a user does not select any type of object at the masking condition designator 12, no selection can be made at the unmasking condition designator 13.

As shown in FIG. 3B, when a user selects Persons at the masking condition designator 12, the unmasking condition designator 13 shows check boxes for Falling, Running, Staggering, and Assaulting, respectively, and the user can select one or more of shown focusing events; that is, Falling, Running, Staggering, and Assaulting as the unmasking conditions.

In this case, when the user selects Falling, a person who is detected to have fallen is excluded from the masking target. When the user selects Staggering, a person who is detected to be staggering is excluded from the masking target. When the user selects Assaulting, a person who is detected to assault others is excluded from the masking target.

As shown in FIG. 3C, when a user selects Vehicles at the masking condition designator 12, the unmasking condition designator 13 shows check boxes for Excessive speed, Collision accident, and Wrong-way driving, respectively, and the user can select one or more of shown focusing events; that is, Excessive speed, Collision accident, and Wrong-way driving as the unmasking conditions.

In this case, when the user selects Excessive speed, a vehicle which is detected to be running at an excessive speed is excluded from the masking target. When the user selects Collision accident, a vehicle which is detected to be involved in a collision accident is excluded from the masking target. When the user selects Wrong-way driving, a vehicle which is detected to be traveling the wrong-way is excluded from the masking target.

As shown in FIG. 3D, when a user selects both Persons and Vehicles at the masking condition designator 12, the unmasking condition designator 13 shows check boxes for focusing events with regard to Persons (Falling, Running, Staggering, and Assaulting), and also show check box for focusing events with regard to Vehicles (Excessive speed, Collision accident, and Wrong-way driving).

In the present embodiment, the unmasking conditions are limited to those with regard to Persons and Vehicles. Thus, in this case, when a user selects Signboards, Animals, or Background without selecting either Persons or Vehicles at the masking condition designator 12, no selection can be made at the unmasking condition designator 13 in the same manner as the example shown in FIG. 3A.

The mask type designator 14 allows a user to designate a type of masking image. In the present embodiment, a user can select a blurred image, a label image, or an avatar image as a masking image.

The video processing device 3 generates a blurred image by extracting images of masking target areas (video areas to be masking targets) from a video and performing a blurring operation using a Gaussian filter on the extracted images of the masking target areas.

The video processing device 3 may be configured to generate a masking image by performing an operation for reducing object-identifiability which is different from the blurring operation, on images of masking target areas. For example, a pixelated image with a reduced apparent resolution may be used as a masked image.

The video processing device 3 generates a label image by filling a masking target area (an inside of the contour of the masking target area) with a prescribed color and drawing characters representing a generic name of each object over the color-filled area. In the present embodiment, the characters "person", "signboard", "vehicle", and "animal" representing the types of objects are drawn as their generic names. In other embodiments, the video processing device 3 may be configured to acquire one or more attributes of an object (e.g., gender or age in the case of Persons) and draw characters representing an attribute(s) of each object.

An avatar image is an image of a mascot or like which imitates a person to be a masking target. In some cases, the video processing device 3 may be configured to acquire a person's attribute (e.g. sex, age) from a video and, based on the acquired attribute, select san avatar image as a masking image. In cases where the designated types of the objects are Signboards, Vehicles, and/or Animals, an image imitating the characteristics of each type of object may be used as a masking image. Furthermore, the video processing device 3 may be configured to detect movements of a person in a video and display an avatar image as a video image (moving picture) which moves so as to reproduce the movements of the person.

For a background, a blurred image is used as a masking image. Accordingly, when masking targets are Persons, Signboards, Vehicles, and/or Animals, a selectable masking image of an object is any one of a blurred image, a label image, and an avatar image, while, when masking targets are background areas, a selectable masking image of an object is only a blurred image.

A masking image for Persons or Vehicles may be a silhouette image formed by filling an inside of the contour of the masking target area with a prescribed color. In this case, when a silhouette image is formed as a transparent masking image which shows through the background, a masking image enables a viewer to easily grasp how the masking image is related to the background concurrently with protecting the privacy of a person or vehicle (foreground).

Next, a masking-processed video on which masking operations have been performed displayed on the video processing device 3 when the settings have changed in the edit screen will be described. FIGS. 4 to 7 are explanatory diagrams showing a masking-processed video on which masking operations have been performed according to different settings in the edit screen.

Figure 4:
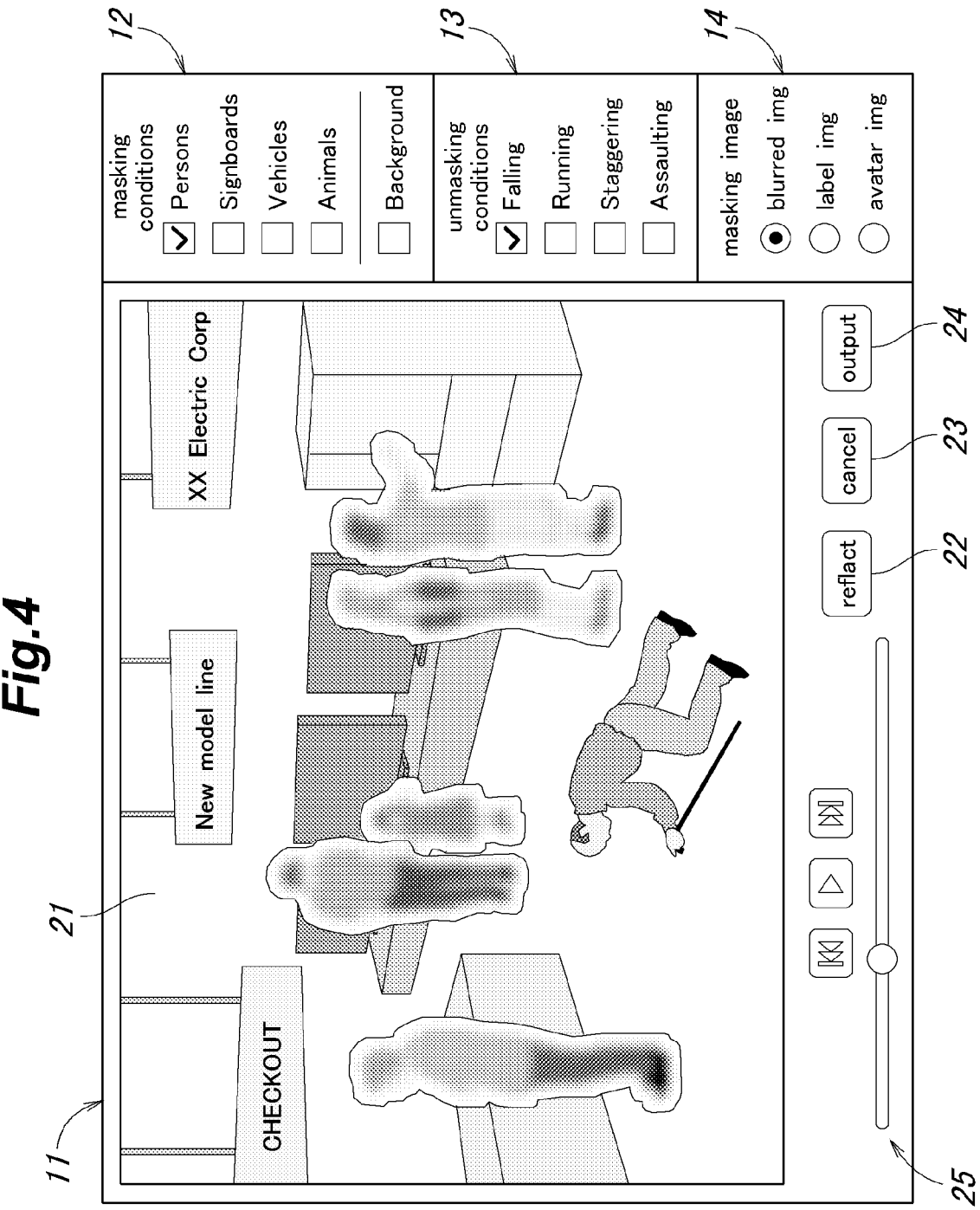
FIG. 4 is an explanatory diagram showing a masking-processed video on which masking operations have been performed according to settings in the edit screen.

In an example shown in FIG. 4, the Persons checkbox is selected in the masking condition designator 12, and Falling is selected in the unmasking condition designator 13. Furthermore, a blurred image is selected in the mask type designator 14.

In this case, the video processing device 3 does not perform the masking operations on a person who is detected to have fallen (Falling event), but performs masking operations on the video areas of the persons other than the person to whom occurrence of Falling event has been detected, so that all the other persons' video areas are changed to blurred images. Thus, only the video areas of the persons to whom occurrence of Falling event has not been detected are masked with blurred images, whereas the remaining video areas in the video are unmasked.

Figure 5:
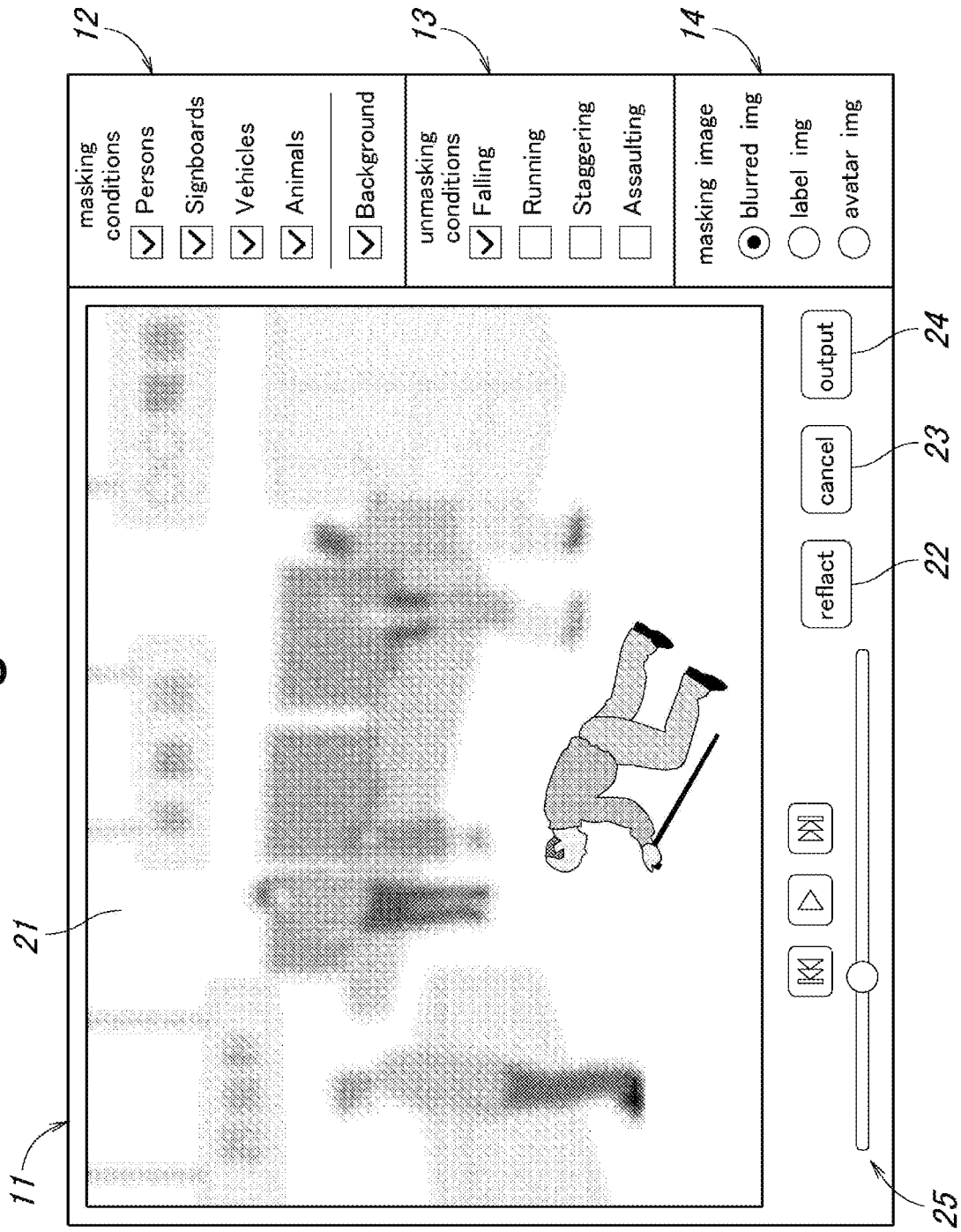
FIG. 5 is an explanatory diagram showing a masking-processed video on which masking operations have been performed according to settings in the edit screen.

In an example shown in FIG. 5, all types of objects (Persons Signboards, Vehicles, and Animals) are selected in the masking condition designator 12, and Falling is selected in the unmasking condition designator 13. Furthermore, a blurred image is selected in the mask type designator 14.

In this case, the video processing device does not perform the masking operations on a video area of a person who is detected to have fallen (Falling event), but performs masking operations on all the video areas other than a vide area of the detected person such that all the video areas other than the person's video area are changed to blurred images. Thus, only the video area of the person to whom occurrence of Falling event has not been detected is unmasked, whereas the remaining video areas are masked.

Figure 6:
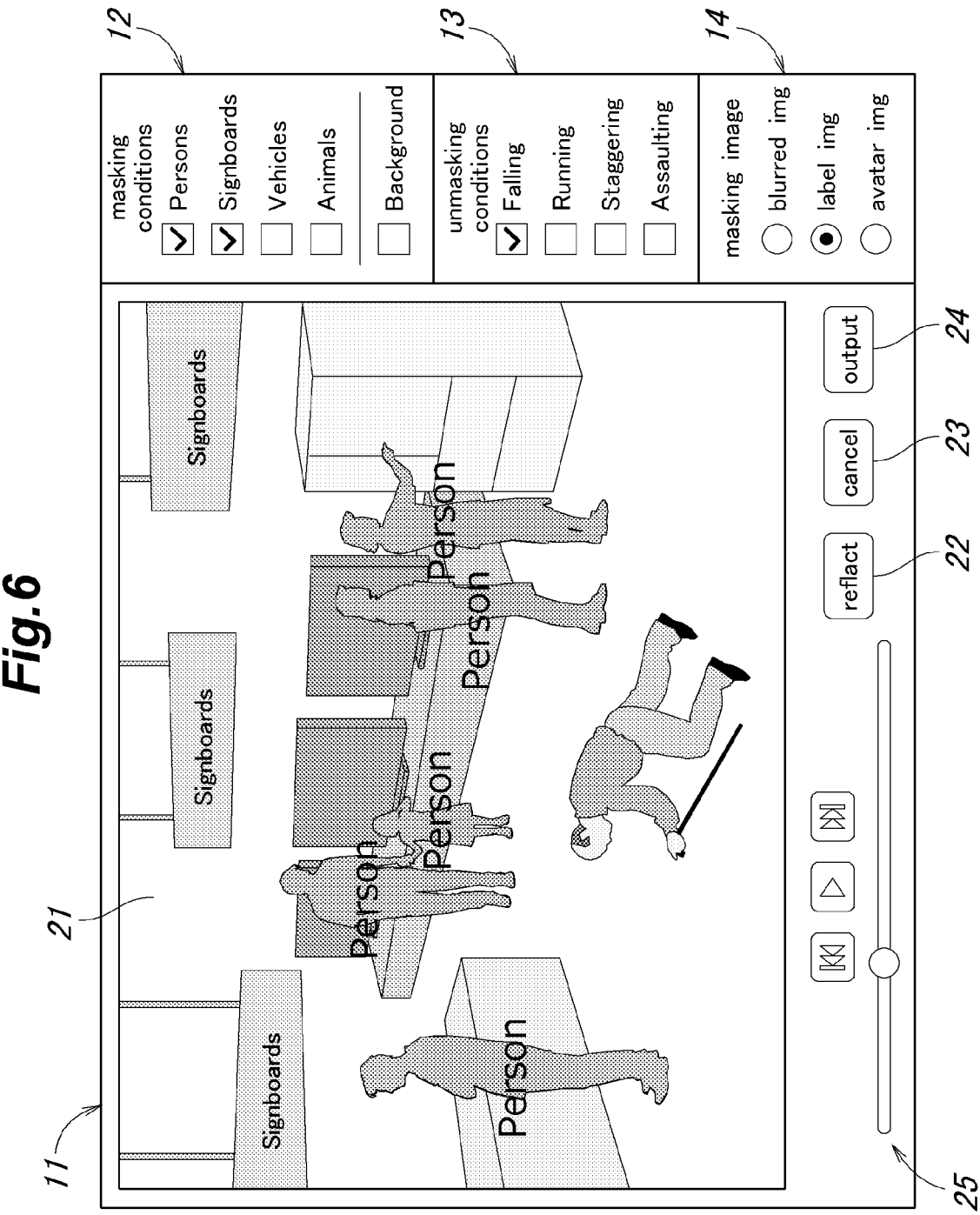
FIG. 6 is an explanatory diagram showing a masking-processed video on which masking operations have been performed according to settings in the edit screen.

In an example shown in FIG. 6, Persons and Signboards are selected in the masking condition designator 12, and Falling is selected in the unmasking condition designator 13. Furthermore, a label image is selected in the mask type designator 14.

In this case, the video processing device 3 does not perform the masking operations on a person who is detected to have fallen (Falling event), but performs masking operations on the video areas of the persons other than the person to whom occurrence of Falling event has been detected, so that all the other persons' video areas are changed to label images. Thus, only the video areas of the persons to whom occurrence of Falling event has not been detected are masked with label images, whereas the remaining video areas in the video are unmasked.

In the present embodiment, the label image is a silhouette image formed by filling an inside of the contour of a masking target area with a prescribed color. However, the label image may be a masking image formed by performing an operation for reducing object-identifiability on an image of a masking target area.

Figure 7:
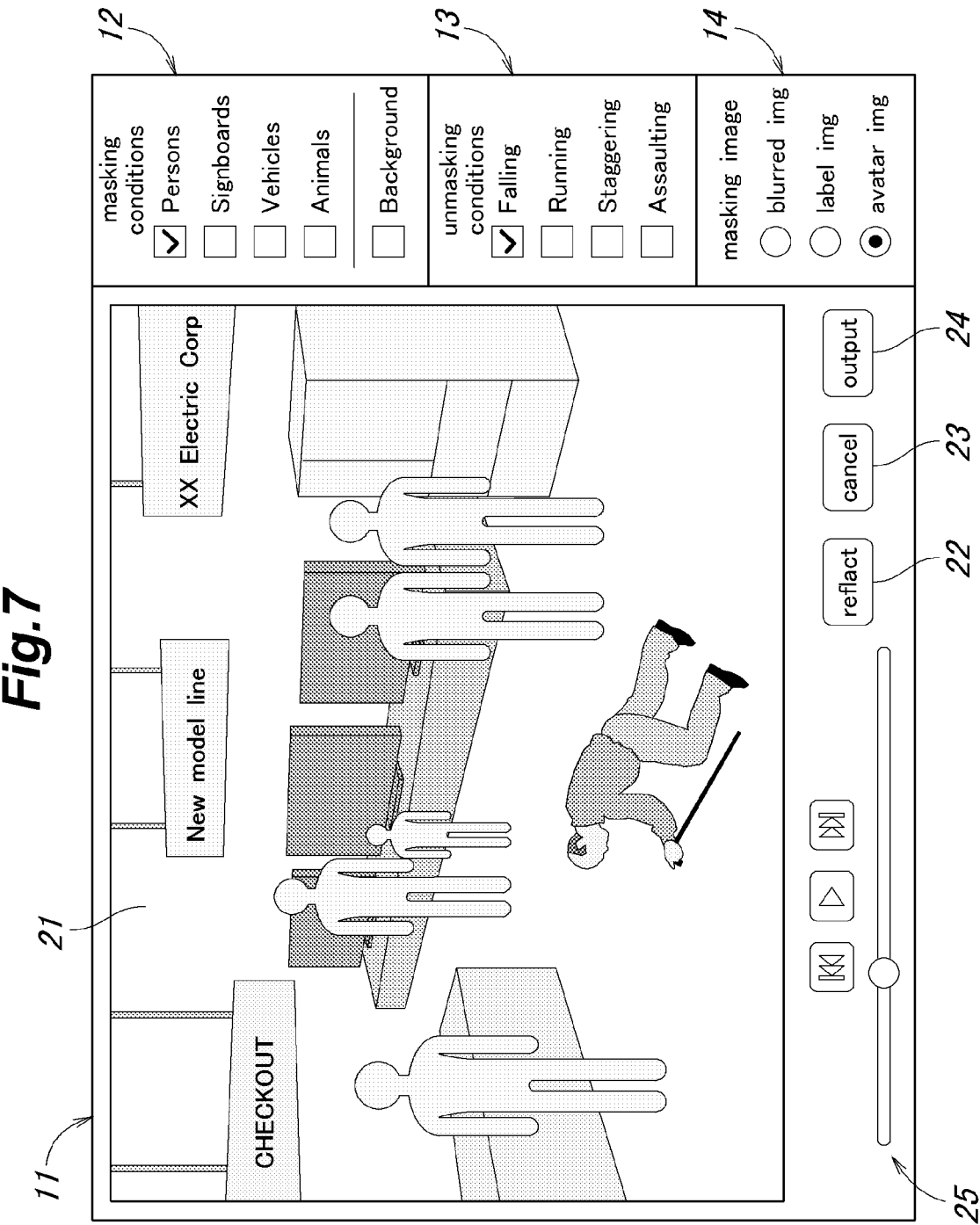
FIG. 7 is an explanatory diagram showing a masking-processed video on which masking operations have been performed according to settings in the edit screen.

In an example shown in FIG. 7, Persons checkbox is selected in the masking condition designator 12, and Falling is selected in the unmasking condition designator 13. Furthermore, an avatar image is selected in the mask type designator 14.

In this case, the video processing device 3 does not perform the masking operations on a person who is detected to have fallen (Falling event), but performs masking operations on the video areas of the persons other than the person to whom occurrence of Falling event has been detected, so that all the other persons' video areas are changed to avatar images. Thus, only the video areas of the persons to whom occurrence of Falling event has not been detected are masked with avatar images, whereas the remaining video areas in the video are unmasked. Moreover, the video processing device 3 may store a plurality of human figure icons (avatar images) corresponding to different statues of a person, and display any of the icons when a video is displayed such that the displayed icon is changed according to the movements of the person.

In this way, in the present embodiment, objects to which occurrence of a focusing event has been detected can be excluded from the masking targets. This enables a user to make a detailed observation of those objects. Moreover, when objects are of the same type as the objects excluded from the masking targets, but no focusing event has been detected thereto, those objects are subject to masking operations so that the privacy of the objects can be protected.

Figure 8:
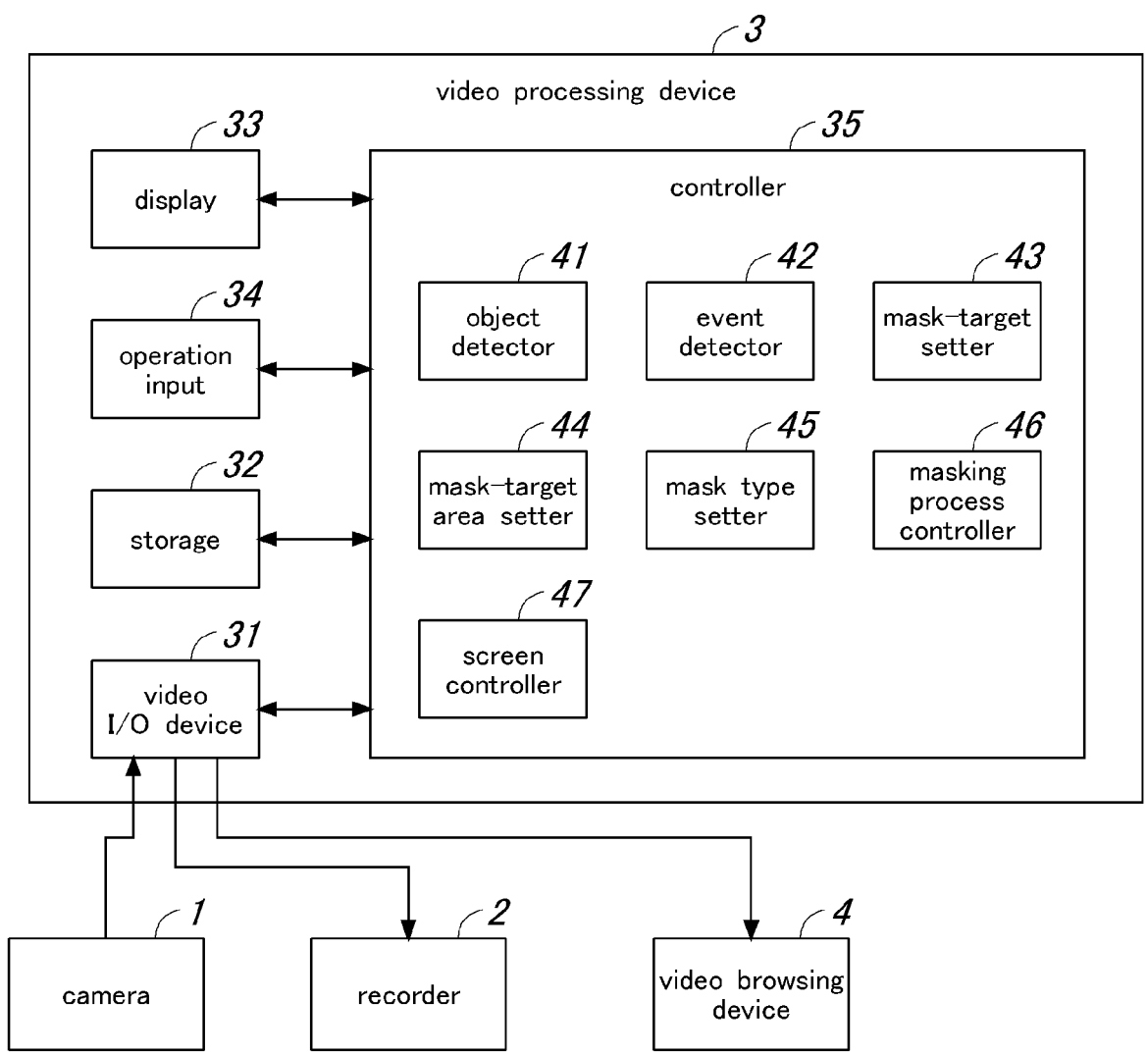
FIG. 8 is a block diagram showing schematic configurations of the video processing device 3 according to the first embodiment.

Next, schematic configurations of the video processing device 3 will be described. FIG. 8 is a block diagram showing schematic configurations of the video processing device 3.

The video processing device 3 includes a video I/O device 31, a storage 32, a display 33, an operation input 34, and a controller 35.

In the case of post-shot processing operations, video records recorded by the recorder 2 are provided to the video I/O device 31, whereas, in the case of real-time processing operations, video records shot by the camera 1 are provided to the video I/O device 31. In addition, the video I/O device 31 outputs edited video generated by the controller 35 so that a user can browse the edited video by using the video browsing device 4.

The storage 32 stores programs executable by a processor, which implements the controller 35. Moreover, the storage 32 stores information records regarding objects detected from videos by the controller 35, as well as settings information provided by users' input.

The display 33 displays edit screens (see FIGS. 2 to 7). The operation input 34 includes an input device such as a mouse, and a user can perform input operations by using the operation input 34.

The controller 35 includes an object detector 41, an event detector 42, a masking target setter 43, a masking target area setter 44, a mask type setter 45, a masking process controller 46, and a screen controller 47. The controller 35 is configured by the processor, which executes a program stored in the storage 32 to thereby implement the video processing controller 35.

The object detector 41 is configured to detect objects included in a video such that types of the objects can be identified. In the present embodiment, the object detector 41 detects various types of objects such as persons, signboards, vehicles, and animals. Moreover, an area in which any type of object is not detected is set as a background area. Any known technology may be used in the object detection. For example, deep-learning-based object detection technologies enable highly accurate detection of objects.

The event detector 42 is configured to detect a focusing event which occurs to each object detected by the object detector 41. In the present embodiment, the event detector 42 detects occurrence of, as focusing events with regard to a person, the person's falling, running, staggering, and assaulting. Any known technology may be used in the detection of events with regard to a person. For example, the event detector 42 can detect a person's falling, running, staggering, and assaulting by detecting the location, posture, moving speed, and action of the person.

The event detector 42 detects occurrence of, as focusing events with regard to a vehicle, an excessive speed, a collision accident, and a wrong-way driving. Any known technology may be used for the detection of events associated with a vehicle. For example, the event detector 42 can detect an excessive speed, a collision accident, and a wrong-way driving which can occur to a vehicle, by detecting the location, moving speed, and traveling direction of the vehicle.

The masking target setter 43 is configured such that, in response to a user's input operation for selecting the type of objects as a masking condition, the masking target setter 43 simultaneously sets all objects of the selected type as masking targets, and that, in response to the user's input operation for selecting the focusing event as an unmasking condition, the masking target setter 43 excludes, from the masking targets, one or more objects to which occurrence of the selected focusing event has been detected by the event detector. In addition, in response to the user's input operation for selecting Background, the masking target setter 43 sets an area in which any type of object is not detected as a background area.

The masking target area setter 44 sets masking target areas (video areas to be masking targets) based on video areas corresponding to a background and to objects set as the masking targets by the masking target setter 43. When an object is set as a masking target, the video area of the object is set as masking target area, whereas, when the background is set as a masking target, the background area is set as masking target area. When all types of objects and a background are selected as masking conditions, the masking target area setter 44 sets all the areas other than one or more objects to which occurrence of a focusing event is detected, as masking target areas.

In response to a user's input operation designating a type of a mask image (blurred image, label image, or avatar image), the mask type setter 45 sets the type of a mask image to be used.

The masking process controller 46 generates a masking image for each masking target area based on the masking target area set by the masking target area setter 44 and the type of masking image set by the mask type setter 45, and performs masking operations by which each masking target area in a video is changed to a corresponding masking image.

The screen controller 47 generates an edit screen (see FIGS. 2 to 7) and displays it on the display 33. Displayed on the edit screen are a video provided from the camera 1 or the recorder 2, or a masking-processed video generated by the masking process controller 46.

Processing operations performed by the video processing device 3 may be post-shot processing operations or real-time processing operations. In the case of real-time processing operations, when the event detector 42 detects a focusing event as an unmasking condition, the video processing device 3 excludes, from the masking targets, the object to which occurrence of the focusing event has been detected. For example, in cases where a user select Persons as a masking condition and selects Falling as an unmasking condition, all persons in a video are initially masked, and upon detecting a person's falling, the person who has fallen is unmasked in the video from then.

Second Embodiment

Figure 9:
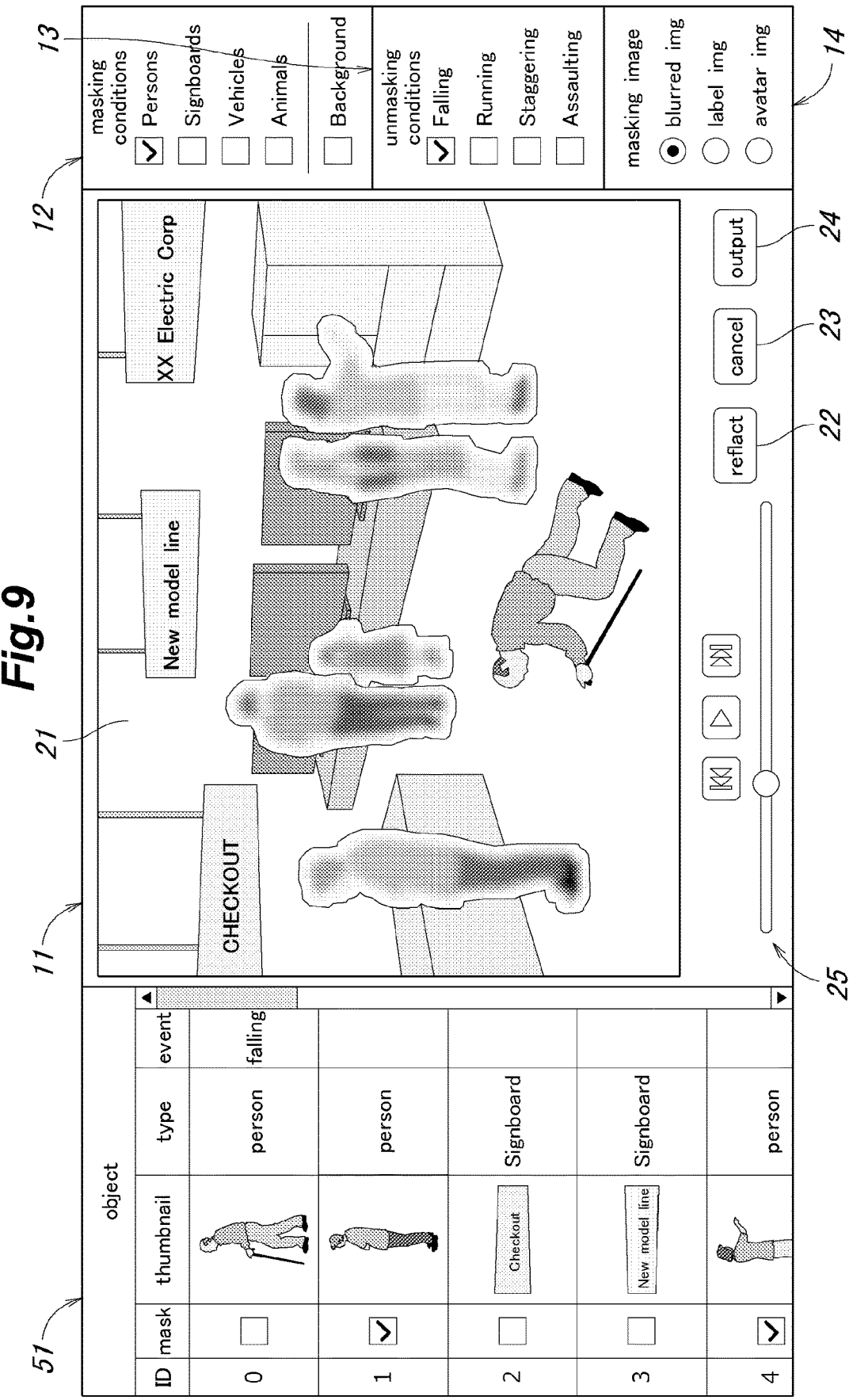
FIG. 9 is an explanatory diagram showing an edit screen displayed on a video processing device 3 according to a second embodiment of the present invention.

Next, a second embodiment of the present invention will be described. Except for what will be discussed here, this embodiment is the same as the above-described embodiment. FIG. 9 is an explanatory diagram showing an edit screen displayed on a video processing device 3 according to a second embodiment of the present invention.

In the first embodiment, when a user selects a type of object as a masking condition, the video processing device 3 simultaneously sets all objects of the selects type as masking targets, while, when the user selects a focusing event as an unmasking condition, the video processing device 3 excludes, from the masking target, any object to which occurrence of the selected focusing event has been detected. In the present embodiment, the video processing device 3 is configured such that a specific object can be set, on an individual basis, as a masking target or excluded from the masking targets.

As shown in FIG. 9, an edit screen includes a video display 11, a masking condition designator 12, an unmasking condition designator 13, and a mask type designator 14 as in the first embodiment. In the second embodiment, the edit screen further includes an individual masking-process designator 51.

The individual masking-process designator 51 is in a table form and indicates, for each detected object, a management ID, use of masking, a thumbnail image, a type of object, and a detected event.

The column of "use of masking" includes checkboxes (selection controls), which allow a user to select whether or not to perform masking operations for each object. Each check box reflects designation in the masking condition designator 12 and in the unmasking condition designator 13. Specifically, depending to the designation in the masking condition designator 12 and the unmasking condition designator 13, the check boxes are checked for the objects set as masking targets, and the checkboxes are unchecked for the objects excluded from the masking targets.

A user can operate one or more checkboxes to thereby change initial states of the checkboxes; that is, make a change of use of masking or not with regard to individual objects. Specifically, when wishing to change states of certain objects from non-masking targets to masking targets, a user operates corresponding checkboxes to be checked, and when wishing to exclude certain objects from the masking targets, the user operates corresponding checkboxes to be unchecked. In this way, a specific object can be set as a masking target or excluded from the masking targets on an individual basis.

Figure 10:
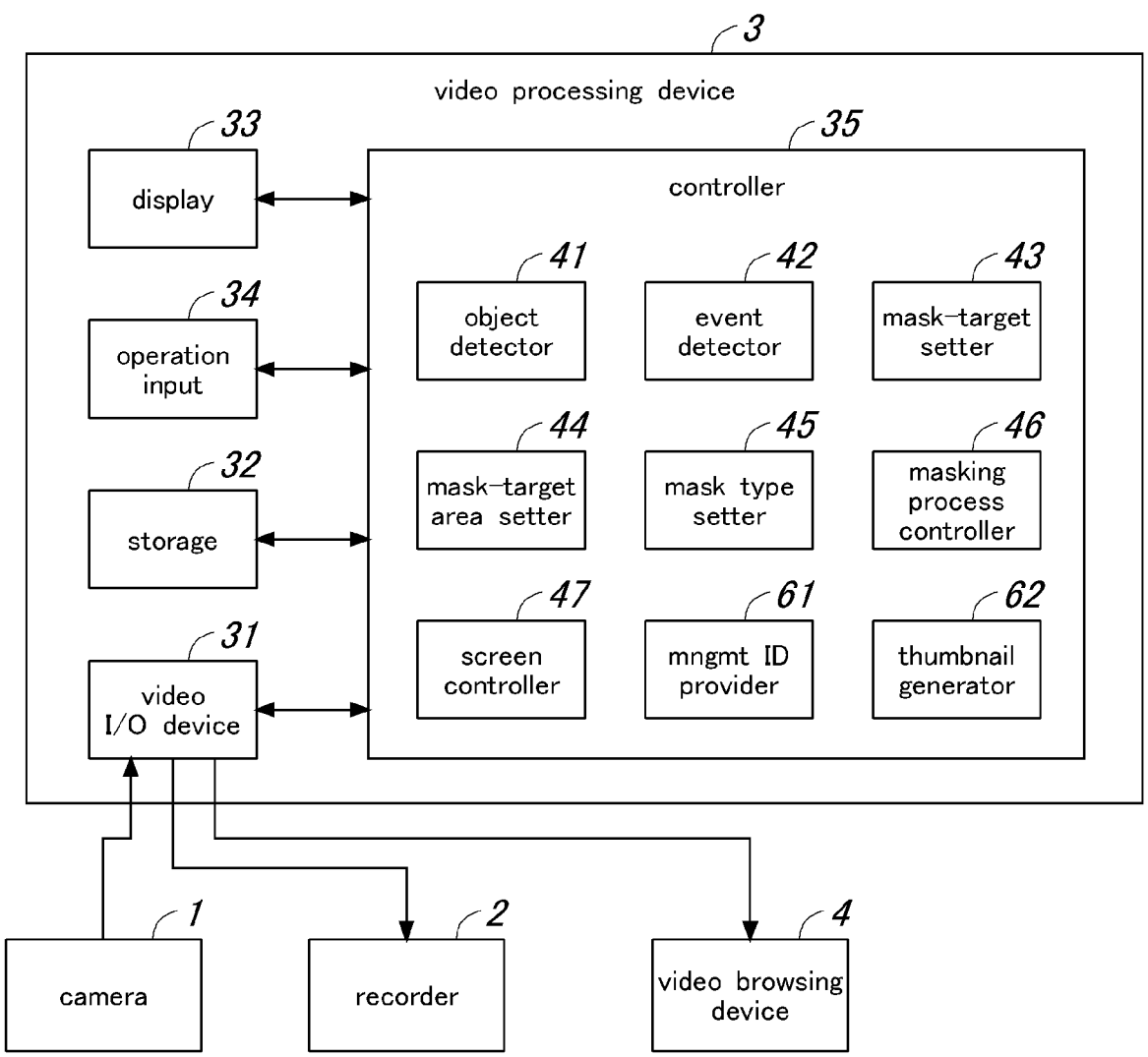
FIG. 10 is a block diagram showing schematic configurations of the video processing device 3 according to the second embodiment.

Next, a video processing device 3 according to the second embodiment will be described. FIG. 10 is a block diagram showing schematic configurations of the video processing device 3.

The video processing device 3 includes a video I/O device 31, a storage 32, a display 33, an operation input 34, and a controller 35 in a similar manner to the first embodiment. The controller 35 (implemented by a processor) includes an object detector 41, an event detector 42, a masking target setter 43, a masking target area setter 44, a mask type setter 45, a masking process controller 46, and a screen controller 47 as in the first embodiment, and further includes a management ID provider 61 and a thumbnail generator 62.

The management ID provider 61 provides each object detected by the object detector 41 with a corresponding management ID.

The thumbnail generator 62 cuts an image of an object out from a video to generate a thumbnail image (a representative still image). Management IDs and thumbnail images are indicated in the individual masking-process designator 51 along with the indications of use of masking (checkboxes), types of objects, and detected events.

The masking target setter 43 can operate in the same manner as the first embodiment; that is, in response to a user's input operation for selecting a type of objects as a masking condition, the masking target setter 43 simultaneously sets all objects of the selected type as masking targets, and, in response to the user's input operation for selecting a focusing event as an unmasking condition, the masking target setter 43 excludes, from the masking targets, one or more objects to which occurrence of the selected focusing event has been detected.

In addition, the masking target setter 43 can operate such that, in response to a user's input operation for individually designating one or more objects as masking targets, the masking target setter 43 sets the designated objects as masking targets, and, in response to the user's input operation for individually excluding one or more objects from the masking targets, the masking target setter 43 excludes the designated the designated objects from the masking targets on an individual basis.

While specific embodiments of the present invention are described herein for illustrative purposes, the present invention is not limited to those specific embodiments. Various changes, substitutions, additions, and omissions may be made for elements of each embodiment. In addition, elements and features of the different embodiments may be combined with each other to thereby yield another embodiment.

INDUSTRIAL APPLICABILITY

A video processing device, a video processing system, and a video processing method according to the present invention achieve an effect of enabling efficient generation of a masking-processed video on which masking operations have been properly performed according to the situation shown in a video in which various objects requiring privacy protection show up, and are useful as a video processing device, a video processing system, and a video processing method for identifying an object from a video of a surveillance target area and performing masking operations based on inputs provided by a user.

Glossary 1 camera
2 recorder
3 video processing device
4 video browsing device
11 video display
12 masking condition designator
13 unmasking condition designator
14 mask type designator
31 video I/O device
32 storage
33 display
34 operation input
35 controller
41 object detector 42 event detector
43 masking target setter
44 masking target area setter
45 masking process controller
47 screen controller
51 individual masking-process designator
61 management ID provider
62 thumbnail generator

The invention claimed is:

1. A video processing device for identifying an object from a video of a surveillance target area and performing masking operations based on inputs provided by a user, the video processing device comprising:
   a processor; and
   a memory including a program that, when executed by the processor, causes the processor to perform operations, the operations including:
      detecting an object included in the video in such a manner that a type of the object is identifiable;
      detecting a focusing event which occurs to the object detected by the processor;
      in response to a first input operation of the user for selecting the type of the object as a masking condition, simultaneously setting all objects of the selected type as masking targets,
      in response to a second input operation of the user for selecting the focusing event as an unmasking condition, excluding, from the masking targets, one or more objects to which occurrence of the selected focusing event has been detected by the processor; and
      generating a masking-processed video in which each video area which corresponds to one of the objects, which is set as one of the masking targets and which is not excluded from the masking targets, has been changed to a masking image.

2. The video processing device according to claim 1, wherein the processor is configured such that, in response to the a third input operation of the user for selecting a background as the masking condition, the processor sets a background area where no object is detected as a masking target.

3. The video processing device according to claim 1, wherein the processor is configured such that, when all types of the objects and the a background are set as the masking targets in response to the a third input operation of the user for selecting all the types of the objects and the background, the processor performs an operation for reducing object-identifiability on all video areas other than the objects to which occurrence of the selected focusing event has been detected.

4. The video processing device according to claim 1, wherein the processor is configured such that, when persons or vehicles are selected as types of objects to be set as the masking condition, the processor enables the user to select the focusing event to be set as the unmasking condition.

5. The video processing device according to claim 1, wherein the masking image is a label image with characters representing a generic name of a corresponding one of the objects.

6. The video processing device according to claim 1, wherein the masking image is an avatar image which imitates a person.

7. The video processing device according to claim 1, wherein the processor is configured such that:

in response to a third input operation of the user for individually designating an object to be a masking target, the processor sets the designated object as the masking target; and
in response to a fourth input operation of the user for individually designating an object to be excluded from the masking targets, the processor excludes the designated object from the masking targets.

8. The video processing device according to claim 7, the operations further including:
   generating a thumbnail image for each object; and
   displaying an edit screen on a display,
   wherein the edit screen includes a list of selection controls in which, for each object, a selection control is arranged side by side with a corresponding thumbnails image, wherein each of the selection controls is used to select whether a corresponding object is designated to be a masking target or designated to be excluded from the masking targets.

9. A video processing system for identifying an object from a video of a surveillance target area and performing masking operations based on inputs provided by a user, the video processing system comprising:
   a camera configured to shoot a video for the surveillance target area;
   a recorder configured to record the video shot by the camera;
   a processor configured to acquire the video from at least one of the camera and the recorder and perform masking operations; and
   a display configured to display a masking-processed video generated by the processor,
   wherein the processor is configured to perform operations, the operations including:
      detecting an object included in the video in such a manner that a type of the object is identifiable;
      detecting a focusing event which occurs to the object detected by the processor;
      in response to a first input operation of the user for selecting the type of the object as a masking condition, simultaneously setting all objects of the selected type as masking targets,
      in response to a second input operation of the user for selecting the focusing event as an unmasking condition, excluding, from the masking targets, one or more objects to which occurrence of the selected focusing event has been detected by the processor; and
      generating a masking-processed video in which each video area which corresponds to one of the objects, which is set as one of the masking targets and which is not excluded from the masking targets, has been changed to a masking image.

10. A video processing method for identifying an object from a video of a surveillance target area and performing masking operations based on inputs provided by a user, the video processing method being performed by a processor in a video processing device, the video processing method comprising:
   detecting an object included in the video in such a manner that a type of the object is identifiable;
   detecting a focusing event which occurs to the object detected by the processor;
   in response to a first input operation of the user for selecting the type of the object as a masking condition, simultaneously setting all objects of the selected type as masking targets;

in response to a second input operation of the user for selecting the focusing event as an unmasking condition, excluding, from the masking targets, one or more objects to which occurrence of the selected focusing event has been detected by the processor; and generating a masking-processed video in which each video area which corresponds to one of the objects, which is set as one of the masking targets and which is not excluded from the masking targets, has been changed to a masking image.

\* \* \* \* \*